US007180027B2

(12) United States Patent
Hable et al.

(10) Patent No.: US 7,180,027 B2
(45) Date of Patent: Feb. 20, 2007

(54) METHOD OF APPLYING ACTIVATABLE MATERIAL TO A MEMBER

(75) Inventors: Christopher Hable, Romeo, MI (US); Michael J. Czaplicki, Rochester, MI (US); David Sheasley, Rochester, MI (US); Kevin Hicks, Harrison Twp., MI (US)

(73) Assignee: L & L Products, Inc., Romeo, MI (US)

( * ) Notice: Subject to any disclaimer, the term of this patent is extended or adjusted under 35 U.S.C. 154(b) by 146 days.

(21) Appl. No.: 11/078,243

(22) Filed: Mar. 11, 2005

(65) Prior Publication Data

US 2005/0217785 A1 Oct. 6, 2005

Related U.S. Application Data

(60) Provisional application No. 60/558,278, filed on Mar. 31, 2004.

(51) Int. Cl.
*B23K 9/02* (2006.01)

(52) U.S. Cl. ................................ 219/117.1; 219/121.46

(58) Field of Classification Search ........... 219/121.17, 219/121.16, 121.46, 117.1
See application file for complete search history.

(56) References Cited

U.S. PATENT DOCUMENTS

| | | | |
|---|---|---|---|
| 1,814,677 | A | 7/1931 | Fennema |
| 4,083,384 | A | 4/1978 | Horne et al. |
| 4,399,174 | A | 8/1983 | Tanaka et al. |
| 4,610,836 | A | 9/1986 | Wycech |
| 4,707,397 | A | 11/1987 | Morimura et al. |
| 4,813,690 | A | 3/1989 | Coburn, Jr. |
| 4,853,270 | A | 8/1989 | Wycech |
| 4,923,902 | A | 5/1990 | Wycech |
| 4,978,562 | A | 12/1990 | Wycech |
| 5,085,021 | A | 2/1992 | Kunert |
| 5,124,186 | A | 6/1992 | Wycech |
| 5,213,391 | A | 5/1993 | Takagi |
| 5,336,349 | A | 8/1994 | Cornils et al. |
| 5,358,397 | A | 10/1994 | Ligon et al. |
| 5,382,397 | A | 1/1995 | Turner, Jr. |
| 5,507,994 | A | 4/1996 | Cornils et al. |
| 5,544,930 | A | 8/1996 | Stedman |

(Continued)

FOREIGN PATENT DOCUMENTS

DE 299 04 705 U1 6/1999

(Continued)

OTHER PUBLICATIONS

Mansour et al., Optimal Bonding Thickness for Vehicle Stiffness.

(Continued)

*Primary Examiner*—Len Tran
(74) *Attorney, Agent, or Firm*—Dobrusin & Thennisch PC

(57) ABSTRACT

There is disclosed a method of applying activatable material to a member of an article of manufacture such as an automotive vehicle. According the method, the activatable material is provided to an applicator followed by applying the activatable material to the member. Preferably, the activatable material is applied in a condition that makes the material suitable for allowing further processing or assembly of the member, the article of manufacture or both.

20 Claims, 4 Drawing Sheets

U.S. PATENT DOCUMENTS

| | | | |
|---|---|---|---|
| 5,554,325 | A | 9/1996 | Kotte et al. |
| 5,693,174 | A | 12/1997 | Nakata et al. |
| 5,755,486 | A | 5/1998 | Wycech |
| 5,766,719 | A | 6/1998 | Rimkus |
| 5,846,465 | A | 12/1998 | Tsujino et al. |
| 5,878,784 | A | 3/1999 | Sales et al. |
| 6,053,210 | A | 4/2000 | Chapman et al. |
| 6,093,358 | A | 7/2000 | Schiewe et al. |
| 6,103,341 | A | 8/2000 | Barz et al. |
| 6,135,541 | A | 10/2000 | Geise et al. |
| 6,253,819 | B1 | 7/2001 | Frendle et al. |
| 6,254,488 | B1 | 7/2001 | Hill |
| 6,270,600 | B1 | 8/2001 | Wycech |
| 6,315,938 | B1 | 11/2001 | Jandali |
| 6,321,793 | B1 | 11/2001 | Czaplicki et al. |
| 6,383,610 | B1 | 5/2002 | Barz et al. |
| 6,389,775 | B1 | 5/2002 | Steiner et al. |
| 6,406,078 | B1 | 6/2002 | Wycech |
| 6,419,305 | B1 | 7/2002 | Larsen |
| 6,444,713 | B1 | 9/2002 | Pachl et al. |
| 6,467,834 | B1 | 10/2002 | Barz et al. |
| 6,471,285 | B1 | 10/2002 | Czaplicki et al. |
| 6,475,610 | B1 | 11/2002 | Keener et al. |
| 6,482,486 | B1 | 11/2002 | Czaplicki et al. |
| 6,550,847 | B2 | 4/2003 | Honda et al. |
| 6,561,571 | B1 | 5/2003 | Brennecke |
| 6,607,831 | B2 | 8/2003 | Ho et al. |
| 6,634,698 | B2 | 10/2003 | Kleino |
| 6,668,457 | B1 | 12/2003 | Czaplicki |
| 6,679,540 | B1 | 1/2004 | Graber et al. |
| 6,752,451 | B2 | 6/2004 | Sakamoto |
| 6,811,864 | B2 | 11/2004 | Czaplicki et al. |
| 6,820,923 | B1 | 11/2004 | Bock |
| 6,887,914 | B2 | 5/2005 | Czaplicki et al. |
| 2002/0066254 | A1 | 6/2002 | Ebbinghaus |
| 2002/0164450 | A1 | 11/2002 | Lupini et al. |
| 2003/0012958 | A1 | 1/2003 | Keener et al. |
| 2003/0054182 | A1 | 3/2003 | Keener et al. |
| 2004/0011282 | A1 | 1/2004 | Myers et al. |
| 2004/0074150 | A1 | 4/2004 | Wycech |
| 2004/0079478 | A1 | 4/2004 | Merz |
| 2004/0135058 | A1 | 7/2004 | Wycech |
| 2004/0195817 | A1 | 10/2004 | Tarbutton et al. |
| 2004/0204551 | A1 | 10/2004 | Lacadie |

FOREIGN PATENT DOCUMENTS

| | | | |
|---|---|---|---|
| EP | 0 588 182 | A2 | 3/1994 |
| EP | 0 679 501 | A1 | 11/1995 |
| EP | 0 748 683 | A2 | 12/1996 |
| EP | 0 755 768 | A1 | 1/1997 |
| EP | 0985737 | | 3/2000 |
| EP | 1 182 087 | A2 | 2/2002 |
| EP | 1 440 867 | | 1/2003 |
| EP | 1331080 | | 7/2003 |
| EP | 1356911 | | 10/2003 |
| EP | 1 428 744 | | 6/2004 |
| EP | 1 134 314 | B1 | 9/2004 |
| EP | 1 508 508 | A1 | 2/2005 |
| FR | 1518739 | | 12/1976 |
| GB | 2 302 360 | | 1/1997 |
| JP | 3-197743 | | 8/1991 |
| JP | 2000-52444 | | 2/2000 |
| JP | 2001-48055 | | 2/2001 |
| JP | 2002331960 | | 11/2002 |
| JP | 2003-226261 | | 8/2003 |
| WO | WO 89/06595 | | 7/1989 |
| WO | WO 96/22324 | | 5/1997 |
| WO | WO 99/36243 | | 7/1999 |
| WO | WO 99/48746 | | 9/1999 |
| WO | WO 00/10802 | | 3/2000 |
| WO | WO 00/38863 | | 7/2000 |
| WO | WO 00/46461 | | 8/2000 |
| WO | WO 02/055923 | A2 | 7/2002 |
| WO | WO 04/078451 | | 9/2004 |
| WO | WO 04/078853 | | 9/2004 |
| WO | WO 05/044630 | A1 | 5/2005 |

OTHER PUBLICATIONS

Klein et al., Application of Structural Foam in the Body in White.
Copending U.S. Appl. No. 10/718,509, filed Jun. 12, 2000.
Copending U.S. Appl. No. 10/761,635, filed Sep. 5, 2001.
Copending U.S. Appl. No. 10/839,084, filed Sep. 24, 2001.
Copending U.S. Appl. No. 10/806,309, filed Aug. 13, 2002.
Copending U.S. Appl. No. 10/646,439, filed Sep. 10, 2002.
Copending European Application Serial No. 0300159.1 filed Jan. 6, 2003.
Copending U.S. Appl. No. 10/742,530, filed Jan. 6, 2003.
Copending U.S. Appl. No. 10/712,069, filed Jan. 28, 2003.
Copending U.S. Appl. No. 10/920,520, filed Oct. 22, 2003.
Copending U.S. Appl. No. 10/941,553, filed Sep. 18, 2003.
Copending U.S. Appl. No. 10/973,050, filed Nov. 3, 2003.
Copending U.S. Appl. No. 10/873,935, filed Jun. 22, 2003.
Copending U.S. Appl. No. 60/646,411, filed Jan. 24, 2005.
European Search Report dated Aug. 18, 2005. Application No. 05075662.6-2113.

METHOD OF APPLYING ACTIVATABLE MATERIAL TO A MEMBER

FIELD OF THE INVENTION

The present invention relates generally to a method of applying activatable material to a member wherein the activatable material is employed for providing adhesion, reinforcement, sealing, baffling, noise/vibration reduction, a combination thereof or the like.

BACKGROUND OF THE INVENTION

For many years, industry has been concerned with designing and providing activatable materials for providing adhesion, baffling, sealing, noise/vibration reduction, reinforcement or the like to articles of manufacture such as automotive vehicles. More recently, it has become important to apply these materials in a condition that makes the materials more adaptable to further processing or assembly of the articles of manufacture. As an example, it can be desirable to apply an activatable material to a member such that the material is in a condition suitable for allowing welding of the member. Thus, the present invention provides a method of applying an activatable material to a member in a condition that makes the member, the material or both suitable for further processing or assembly.

SUMMARY OF THE INVENTION

Accordingly, a method is provided for applying an activatable material to a member for providing sealing, baffling, reinforcement or a combination thereof to the member. According to the method the activatable material is provided to an applicator such as an extruder. Typically the activatable material includes an epoxy resin, although not necessarily required. The applicator applies the activatable material (e.g., as a bead) upon a surface of a member of an article of manufacture such as an automotive vehicle. After or upon application of the material to the member the activatable material typically has a viscosity of at least about 100 poise and less than about 1200 poise at a temperature of 45° C. and a shear rate of 400 1/s. Preferably, the activatable material is positioned upon the member and has a consistency such that, during assembly of the automotive vehicle, at least a portion of the activatable material can be displaced during a welding operation (e.g., an electrical resistance welding operation) allowing formation a desirable weld or weld button.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENT

Figure 1:
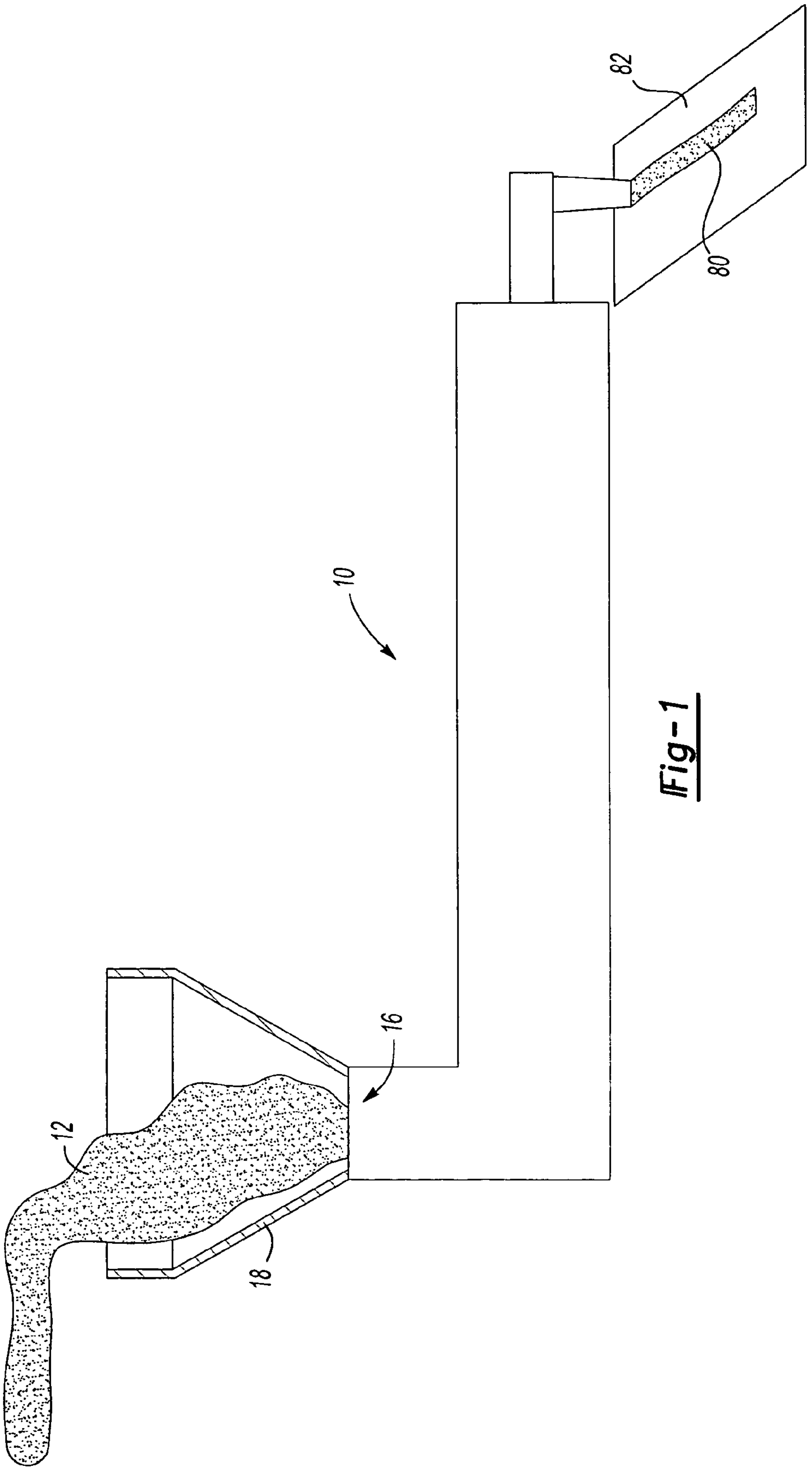
FIG. 1 is a schematic diagram of a material being applied to a member according to one exemplary embodiment of the present invention.

The present invention is predicated upon the provision of a method for applying an activatable material to a surface of a member. It is contemplated that the member may be a component of various articles of manufacture such as boats, trains, buildings, appliances, homes, furniture or the like. It has been found, however, that the method is particularly suitable for application to members of automotive vehicles. Generally, it is contemplated that the material may be applied to various members such as members that are part of a body, a frame, an engine, a hood, a trunk, a bumper, combinations thereof or the like of an automotive vehicle. It is also contemplated that the member may be a carrier for a reinforcement, a baffle, a seal, a combination thereof or the like of the automotive vehicle.

The method typically includes the steps of:

a) providing an activatable material to an applicator;

b) applying the activatable material to a member of an article of manufacture; and c) optionally, further processing the member, the article of manufacture or both.

As used for the present invention, the term activatable material is intended to mean a material that can be activated to cure, expand (e.g., foam), soften, flow or a combination thereof. Thus, it is contemplated for the present invention that an activatable material may be activated to perform only one of aforementioned activities or any combination of the aforementioned activities unless otherwise stated.

The applicator for applying the activatable material is typically an extruder or a pump (e.g., a gear pump), although not necessarily required. Examples of extruders include single screw extruders, twin screw extruders, reciprocating extruders, combinations thereof or the like. Other exemplary applicators (e.g., extruders) and methods of using the applicators, which may be employed in conjunction with the present invention are disclosed in U.S. Pat. No. 5,358,397 and U.S. patent application Ser. No. 10/342,025 filed Jan. 14, 2003; both of which are incorporated herein by reference for all purposes.

Depending upon the technique employed for providing the activatable material to the applicator, the various components of the activatable material may intermix within the applicator, may be intermixed prior to being provided to the applicator, may intermix upon or after exiting the applicator or a combination thereof. Typically, it is desirable for the activatable material to be substantially homogeneous upon application to a substrate, although not required.

Generally, it is contemplated that the activatable material may be provided to an applicator using a variety of techniques. It is further contemplated that the activatable material may be provided to the applicator in a variety of conditions. For instance, the activatable material may be solid, semi-solid, flowable, liquid, a combination thereof or the like. Moreover, the activatable material may be provided to the applicator as a substantially continuous mass or as a plurality of masses (e.g., pellets).

In one embodiment shown in FIG. 1, the activatable material is provided to an applicator 10 (e.g., an extruder) as one or more slugs 12 of semi-solid or flowable material. Typically, the applicator 10 includes an opening 16 suitable for receiving the slugs 12 of material. In the embodiment shown, the applicator 10 has a semi-conical or conical member 18, which assists in guiding the slugs 12 toward the opening 16. Preferably, although not required, the opening 16 is relatively large and has no cross-sectional areas that are below about 0.0225 $m^2$, more typically below about 0.25 $m^2$ and even more typically below about 0.5 $m^2$.

The slugs 12 of activatable material may be supplied to the applicator 10 using various different techniques. For example, the activatable material may be slid, dumped, poured or otherwise supplied to the applicator 10. It is also contemplated that the slugs may be manually supplied to the applicator (e.g., hand fed) or may be automatically (e.g., robotically) supplied to the applicator. As one example, a first extruder may be used to form the slugs 12 from a selection of solid and/or liquid ingredients and the slugs 12 may then be manually or automatically supplied to the applicator 10.

Although not necessarily required, the slugs 12 of activatable material are relatively viscous as they are fed to the applicator 10. Typically, the slugs have a viscosity, at 45° C. and a shear rate of 400 1/s, of at least about 100 poise or less, more typically at least about 200 poise and even more typically at least about 400 poise. The slugs also typically have a viscosity, at 45° C. and a shear rate of 400 1/s, of less than about 1500 poise or greater, more typically less than about 1200 poise, even more typically less than about 1000 poise and still more typically less than about 800 poise.

Figure 2:
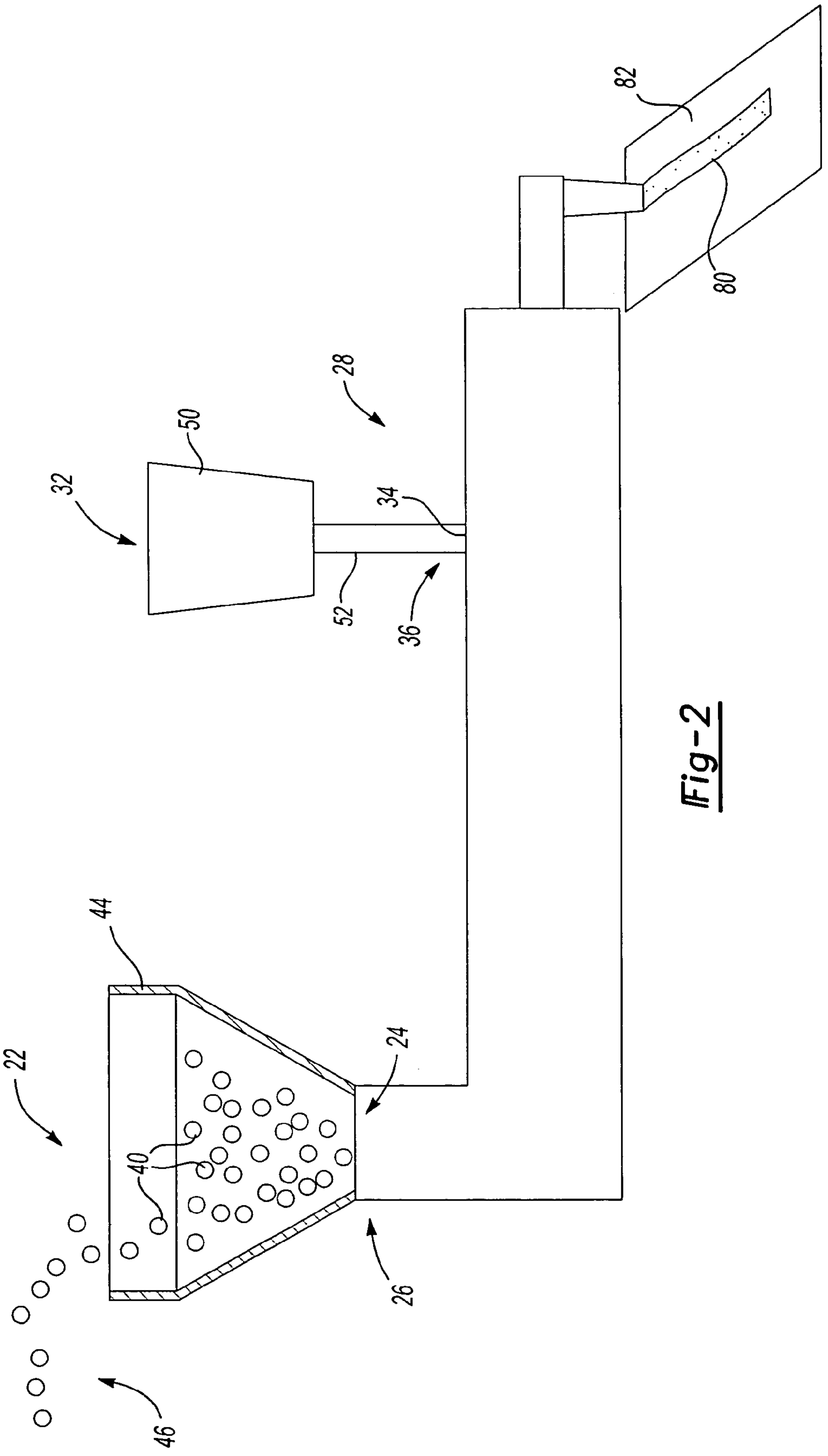
FIG. 2 is a schematic diagram of a material being applied to a member according to another exemplary embodiment of the present invention.

In another embodiment, which is shown in FIG. 2, a first portion 22 of the activatable material may be received in a first opening 24 at a first location 26 of an applicator 28 and a second portion 32 of the activatable material may be received in a second opening 34 at a second location 36 of the applicator 28. In the illustrated embodiment, the first portion 22 is supplied as masses 40 (e.g., pellets) of solid or substantially solid material. Preferably, the masses 40 are non-blocking or substantially tack free.

Like the previous embodiment, the applicator 28 may have a semi-conical or conical member 44 or other member, which assists in guiding the masses 40 toward the opening 24. In one highly preferred embodiment, a loss-in-weight feeder (i.e., a feeder that measures the loss in weight of a supply of material as the amount of material supplied) is employed. In FIG. 2, a conveyor belt 46 having such a weight measurement system is employed for delivering a desired mass at a desired rate to the applicator 28. Of course such mass and such rate will depend upon the desired formulation and desired amount of activatable material to be applied.

The masses 40 typically include a relatively high percentage of polymeric material having a relatively high molecular weight. The polymeric material may be selected from any of the materials discussed herein such as phenoxy-based materials, urethane-based material, EVA or EMA-based materials, solid epoxy resins, epoxy/rubber adducts, combinations thereof or the like and particularly materials discussed below in relation to the activatable material. One preferred material is an epoxy based material and more preferably is a solid bisphenol A epoxy based material.

The percentage of polymeric material in the masses having a relatively high molecular weight is preferably at least about 30% by weight, more preferably at least about 50% by weight and event more preferably at least about 65% by weight. As used herein, a relatively high molecular weight is intended to mean a molecular weight high enough to maintain the polymeric material in a solid state at about room temperature (e.g., between about 5° C. and about 50° C.). For example, relatively high molecular weights for an epoxy-based material (e.g., a bisphenol epoxy based material) are typically greater than about 1000 or less, more typically greater than about 1200 and even more typically greater than about 1400.

The second portion 32 of the activatable material is illustrated in FIG. 2 as being provided as a liquid from a reservoir 50 via a tubular structure 52 to the second opening 34 of the applicator 28. The second opening 34 of the applicator 28 is typically a distance (e.g., at least 10, 30 or 50 centimeters) away from the first opening 34 and is preferably downstream from the first opening 24. In a preferred embodiment, the second portion 32 of activatable material is pumped or otherwise delivered to the applicator at a desired mass flowrate, which will depend upon the desired formulation and desired amount of activatable material to be applied. A pump such as a gear pump, a diaphragm pump or the like, which can be equipped with a sensor (e.g., a mass flow, volume flow or pressure detector), may be employed for supplying the desired amount of activatable material at the desired rate.

The second portion 32 of activatable material will typically include a relatively high percentage of polymeric, oligomeric or monomeric material having a relatively low molecular weight. The material may be selected from any of the materials discussed herein or exemplary material such as liquid rubber, epoxidized novalacs, processing oils, plasticizers, acrylics combinations thereof or the like and particularly materials discussed below in relation to the activatable material. One preferred material is an epoxy-based material and more preferably is a liquid bisphenol A epoxy-based material.

The percentage of polymeric material in the second portion 32 having a relatively low molecular weight is typically at least about 1% by weight or less, more typically at least about 10% by weight and even more typically at least about 25% and still more typically at least about 50 or even 75% by weight. As used herein, a relatively low molecular weight is intended to mean a molecular weight low enough to maintain the material in a liquid state at about room temperature (e.g., between about 5° C. and about 50° C.). For example, relatively low molecular weights for an epoxy-based material (e.g., a bisphenol epoxy based material) are typically lower than about 600 or greater, more typically lower than about 500 and even more typically lower than about 380.

Figure 3:
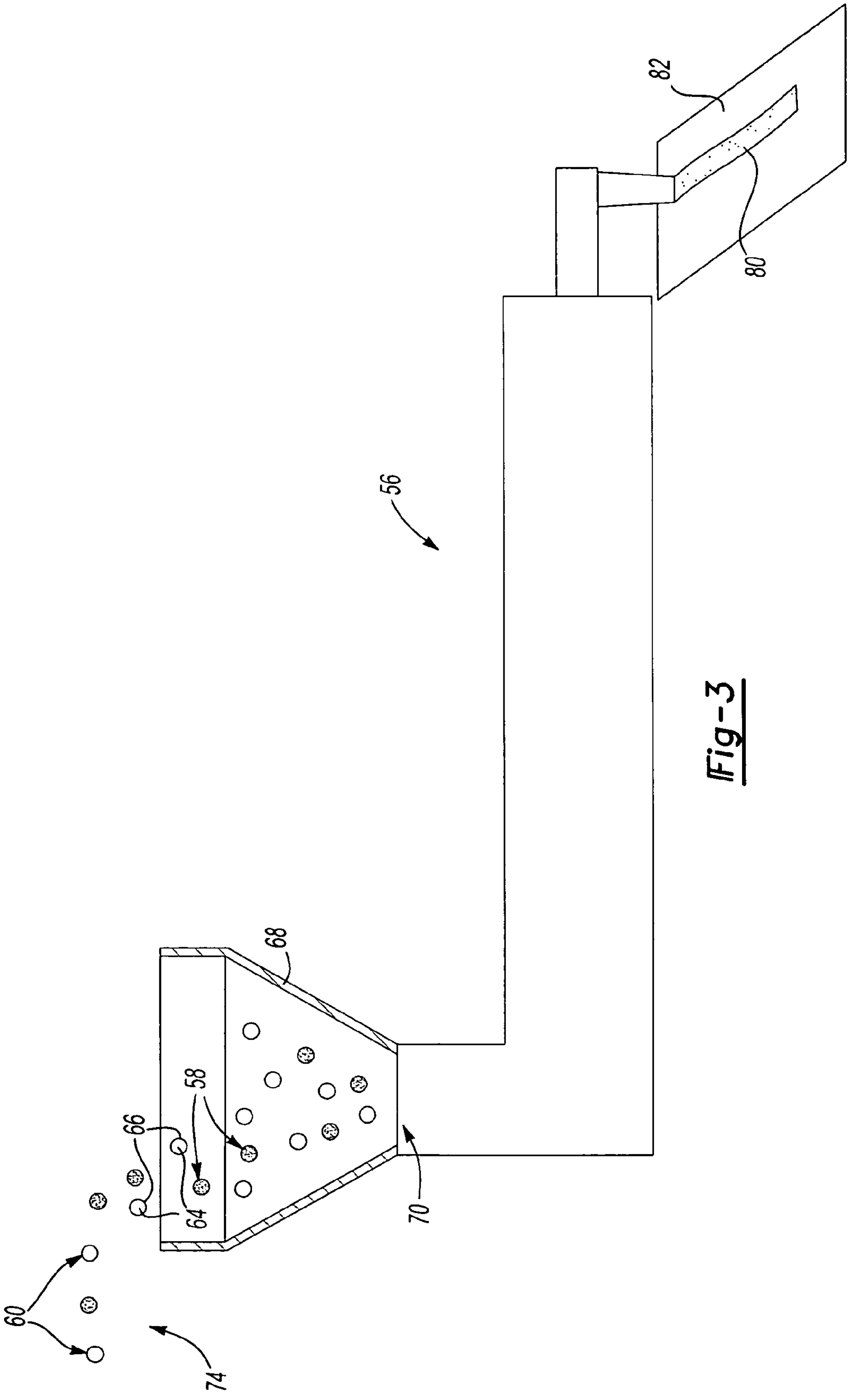
FIG. 3 is a schematic diagram of a material being applied to a member according to still another exemplary embodiment of the present invention.

In another alternative embodiment shown in FIG. 3, a first portion of the activatable material is provided to an applicator 56 as first masses 58 (e.g., pellets) and a second portion is provided as second masses 60 (e.g., capsules). In the illustrated embodiment, the first masses 58 are a solid or substantially solid and substantially homogeneous material and are non-blocking or substantially tack free. In contrast, the second masses 60 are formed as a liquid material 64 that is enclosed by an encapsulation 66. Preferably, the encapsulation is at least partially formed of a thermoplastic or other polymeric material, although not required.

Like the previous embodiments, the applicator 56 may have a semi-conical or conical member 68 or other member, which assists in guiding both the first masses 58 and the second masses 60 toward the opening 70. Also like the embodiment of FIG. 2, a conveyor belt 74 having a weight measurement system may be employed for delivering a desired amount or mass of the first and second masses 58, 60 at a desired rate to the applicator 56. Of course such amount and such rate will depend upon the desired formulation and desired amount of activatable material to be applied.

In one alternative exemplary embodiment, it is contemplated that a vibratory conveyor, which may or may not be a loss-in-weight feeder, may be employed for delivering masses according to the embodiments of FIG. 2 or FIG. 3. In another alternative exemplary embodiment, it is contemplated that a vacuum system may be employed for delivering and/or metering masses according to the embodiments of FIG. 2 or FIG. 3.

The first masses 58 typically include a relatively high percentage of polymeric material having a relatively high molecular weight. The percentage of polymeric material in the masses having a relatively high molecular weight is preferably at least about 30% by weight, more preferably at least about 50% by weight and event more preferably at least about 65% by weight. The polymeric material may be selected from any of the materials discussed herein such as phenoxy-based materials, high molecular weight epoxies, epoxy-rubber adducts, urethane-based material, EVA or EMA-based materials, combinations thereof or the like and particularly materials discussed below in relation to the activatable material. One preferred material is an epoxy based material and more preferably is a solid bisphenol epoxy based material.

The second masses 60, particularly the liquid 64 of the second masses, of activatable material will typically include a relatively high percentage of polymeric, oligomeric or monomeric material having a relatively low molecular weight. The percentage of material in the masses having a relatively low molecular weight is typically at least about 1% by weight or less, more typically at least about 10% by weight and even more typically at least about 25% by weight and still more typically at least about 50 or even 75% by weight. The material may be selected from any of the materials discussed herein or exemplary material such as liquid rubber, epoxidized novalacs, processing oils, plasticizers, acrylics combinations thereof or the like and particularly materials discussed below in relation to the activatable material. One preferred material is an epoxy-based material and more preferably is a liquid bisphenol epoxy-based material.

It should be recognized that each of the techniques illustrated by FIGS. 1–3 may be employed to provide the activatable material to an applicator such that the applicator can apply the activatable material to a member. It should further be recognized, however, that the skilled artisan will be able to think of a variety of modifications to these techniques within the scope of the present invention.

For the embodiment FIG. 3, it is contemplated that the thermoplastic encapsulations may be ruptured and/or melted and intermixed with the rest of the activatable material due to the pressure and mixing experienced in an extruder or other applicator. It is also contemplated that the encapsulations could merely rupture within the extruder or applicator and may only melt later (e.g., in an automotive e-coat or paint drying oven). As such, the encapsulations may be soft, flexible, semi-rigid, rigid or the like. If the encapsulation are designed to melt in an extruder, they will typically have a melting point of between about 40° C. and about 120° C., however, if the encapsulation is configured to melt in an e-coat or paint dry oven, the melting temperature will typically be between about 130° C. to about 250° C.

It is contemplated that the encapsulations may have a variety of different shapes and sizes and the encapsulations should not be limited by size or shape unless otherwise specifically stated. According to one embodiment, however, the encapsulations are relatively small and have a greatest diameter of less than about 1.5 cm or greater, more typically less than about 1.0 cm and even more typically less than about 0.6 cm. As used herein, the term greatest diameter means the furthest distance from one point of an encapsulation to another point of that encapsulation.

In one embodiment, it is contemplated that the activatable material may be entirely or substantially entirely supplied as encapsulations such as those shown in FIG. 3. In the embodiment, however, a first portion entirely or substantially entirely encapsulates a second portion. The first portion is typically substantially solid and typically has the characteristics (e.g., weight percentage of solids and other characteristics) of the other first portions described herein. At the same time, the second portion is typically substantially liquid or semi-solid and typically has the characteristics (e.g., weight percentage of liquids and other characteristics) of the other second portions described herein. The skilled artisan will recognize that such encapsulations may be formed according to a variety of techniques including, but not limited to, injection of the second portion into a hollow portion of a molded or otherwise formed first portion. In such an embodiment, the encapsulations would be provided to an applicator (e.g., extruder) and the first portions and second portions of the encapsulations would typically be intermixed within the applicator. Advantageously, such encapsulations could be provided with an amount of first portion and an amount of second portion that would produce an activatable material of a desired consistency and/or viscosity once dispensed, as further described herein.

In yet another embodiment, it is contemplated that the activatable material may be a combination material or a two component/latent curing material. In such an embodiment, the activatable material would be provided to an applicator as a first liquid and a second liquid. As used, herein the first and second liquid could be entirely liquid or could be semi-solids such as pastes or slurries.

The first and second liquid could be provided by pumps or other mechanisms and the applicator could be nearly any member (e.g., a nozzle) that provides a chamber for intermixing of the first and second liquid. Upon intermixing, at least one component (e.g., an acid or amine) of the first liquid would react with at least one component (e.g., an epoxy resin) of the second liquid to form an activatable material that, upon application to a substrate, has desired characteristics such as a desired viscosity as further described herein. The first liquid, the second liquid or both will also typically include a latent or heat activated curing agent and/or blowing agent such that the activatable material may be activated to cure, expand (e.g., foam) or both in a manner also described herein (e.g., in an e-coat or paint dry oven). Further, it is contemplated that the first liquid and second liquid may be intermixed directly upon a substrate or intermixed between an applicator and the substrate during application of the activatable material.

Generally, applicators of the present invention may apply activatable material to a substrate or member in a variety of configurations and may apply the material to a variety of members. As examples, it is contemplated that the activatable material may be applied as continuous (e.g., as a singular continuous mass) or discontinuous (e.g., as multiple separated masses). Furthermore, the activatable material may be applied in a variety of shapes (e.g., as a bead, as a layer or otherwise) and a variety of thickness. Exemplary thickness is typically between about 0.1 mm to about 2 cm, more typically 0.5 mm to about 5 mm although such thickness may vary widely depending upon the desired function or particular application of the activatable material.

The members to which the activatable material are applied may be configured for installation within a variety of articles of manufacture as discussed. In one preferred embodiment, the activatable material is applied to a member that is to be assembled to an automotive vehicle. Members that may be assembled to an automotive vehicle can include, without limitation, body members (e.g., inner or outer quarter panels, inner or outer panels of a vehicle door, hood, roof, closure panel, a bumper, a pillar, combinations thereof or the like), frame members (e.g., frame rails), engine or chassis components or other members. Other members, which may be assembled to an automotive vehicle include carrier members, which may be used to form baffles, reinforcement members, combinations thereof or the like. In the illustrative embodiments of FIGS. 1–3, the applicators 10, 28, 56 are shown a delivering a continuous bead 80 of activatable material to a member 82, which is shown as a metal panel.

The activatable material may be formed of a variety of suitable materials. In one embodiment, the activatable material is formed of a heat activated material having foamable characteristics, although not required. In alternative embodiments, the material may be non-foamable or non-expanding. The material may be generally dry to the touch (e.g., non-tacky) or slightly tacky, or more substantially tacky and may be shaped in any form of desired pattern, placement, or thickness, but is preferably of substantially uniform thickness.

The activatable material may have a polymeric formulation that includes or is based upon one or more of an epoxy, an acrylate, an acetate, an elastomer, a combination thereof or the like. For example, and without limitation, the may include ethyl methacrylate (EMA), glycidyldimethacrylate (GMA), ethylene or other copolymers and terpolymers with at least one monomer type an alpha-olefin. Other possible materials includes phenol/formaldehyde materials, phenoxy materials, and polyurethane materials or the like.

It shall be recognized that, depending upon the application, a number of baffling, sealing, structural reinforcing, adhesion or other materials, which may be expandable or non-expandable, may be formulated in accordance with the present invention. A typical material includes a polymeric base material, such as one or more ethylene-based polymers which, when compounded with appropriate ingredients (typically a blowing and curing agent), activates (e.g., expands, cures or both) in a reliable and predictable manner upon the application of heat or the occurrence of a particular ambient condition. From a chemical standpoint for a thermally-activated material, which may be structural, sealing or acoustical, can be initially processed as a flowable material before curing, and upon curing, the material will typically cross-link making the material incapable of further flow.

The activatable material of the present invention has been found particularly useful for application requiring sealing and structural reinforcement. For these applications, expansion of the activatable material is typically small if there is any expansion at all. In general, it is desirable for the material to include good adhesion durability. Moreover, it is typically desirable that, the material does not generally interfere with the materials systems employed by automobile or other manufacturers.

It is also contemplated that the activatable material may include one or more conductive materials, which can assist in weld-through of the material. Examples of such materials includes graphite, carbon-black, iron phosphide, metal particulate (e.g., pellets, shavings or the like), combinations thereof or the like.

In applications where the activatable material is a heat activated material, an important consideration involved with the selection and formulation of the material is the temperature at which a material cures and, if expandable, the temperature of expansion. Typically, the material becomes reactive (cures, expands or both) at higher processing temperatures, such as those encountered in an automobile assembly plant, when the foam is processed along with the automobile components at elevated temperatures or at higher applied energy levels, e.g., during paint curing steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher.

If the activatable material is expandable, it may be configured to have a wide variety of volumetric expansion levels. As an example, the activatable material may expand to at least about 101%, at least about 300%, at least about 500%, at least about 800%, at least about 1100%, at least about 1500 %, at least about 2000%, at least about 2500% or at least about 3000% its original or unexpanded volume. An example of such an expandable material with such variable expansion capabilities is disclosed in commonly owned copending U.S. patent application titled Expandable Material, attorney docket # 1001-141P1, filed on the same date as the present application and fully incorporated herein by reference for all purposes. Of course, in other embodiments, the expandable material may be configured to have less volumetric expansion, particularly for structural applications. For example, the expandable material may be configured to expand between about 110% and about 700% (i.e., about 10% to about 600% greater that than the original unexpanded volume), more typically between about 130% and about 400% its original or unexpanded volume.

Upon application to a member and thereafter, it may be desirable for the activatable material to exhibit desired characteristics to allow for further processing or assembly of the activatable material, the member to which it is applied or both. For example, it may be desirable for the activatable material to be elastic such that it can be deformed or stretched followed by allowing the material to at least partially regain its original configuration.

In one embodiment, it is preferable for the activatable material to be relatively easily displaceable such that it causes minimal interference with further processing or assembly steps (e.g., a welding step). In such an embodiment, the activatable material will typically have a viscosity, at 45° C. and a shear rate of 400 1/s, of at least about 100 poise or less, more typically at least about 200 poise and even more typically at least about 400 poise. The slugs also typically have a viscosity, at 45° C. and a shear rate of 400 1/s, of less than about 1500 poise or greater, more typically less than about 1200 poise, even more typically less than about 1000 poise and still more typically less than about 800 poise. Advantageously, provision of the activatable material at such a viscosity can assist the activatable material in whetting surfaces of substrates and/or mating surfaces of substrates when such characteristics are desirable.

One exemplary formulation for a material having desirable Theological properties is provided below as table A:

TABLE A

| Ingredients | Weight Percentages |
|---|---|
| Solid Epoxy/Rubber Adduct | 14.4 |
| EMA-GMA terpolymer | 7.0 |
| Nanoclay | 2.8 |
| Solid Epoxy | 7.2 |
| Liquid Epoxy/Rubber Adduct | 10.8 |
| Liquid Epoxy | 28 |
| Dicyandiamide | 3.1 |

TABLE A-continued

| Ingredients | Weight Percentages |
|---|---|
| Modified Urea | 0.8 |
| Calcined Clay | 18.74 |
| Blowing Agent | 0.1 |
| Castor Wax | 2 |
| Graphite | 5 |
| Carbon Black | 0.06 |

Such displaceable materials as described herein can be particularly suitable for allowing weld-through. Thus, in one embodiment of the present invention, it is contemplated that the activatable material is applied to a portion of the member and the portion of the member is subsequently welded. Generally, the member may be welded to another member or welding may be carrier out on the single member. Moreover, the welding may take place prior to, during or after assembly of the member to its article of manufacture (e.g., an automotive vehicle).

Figure 4:
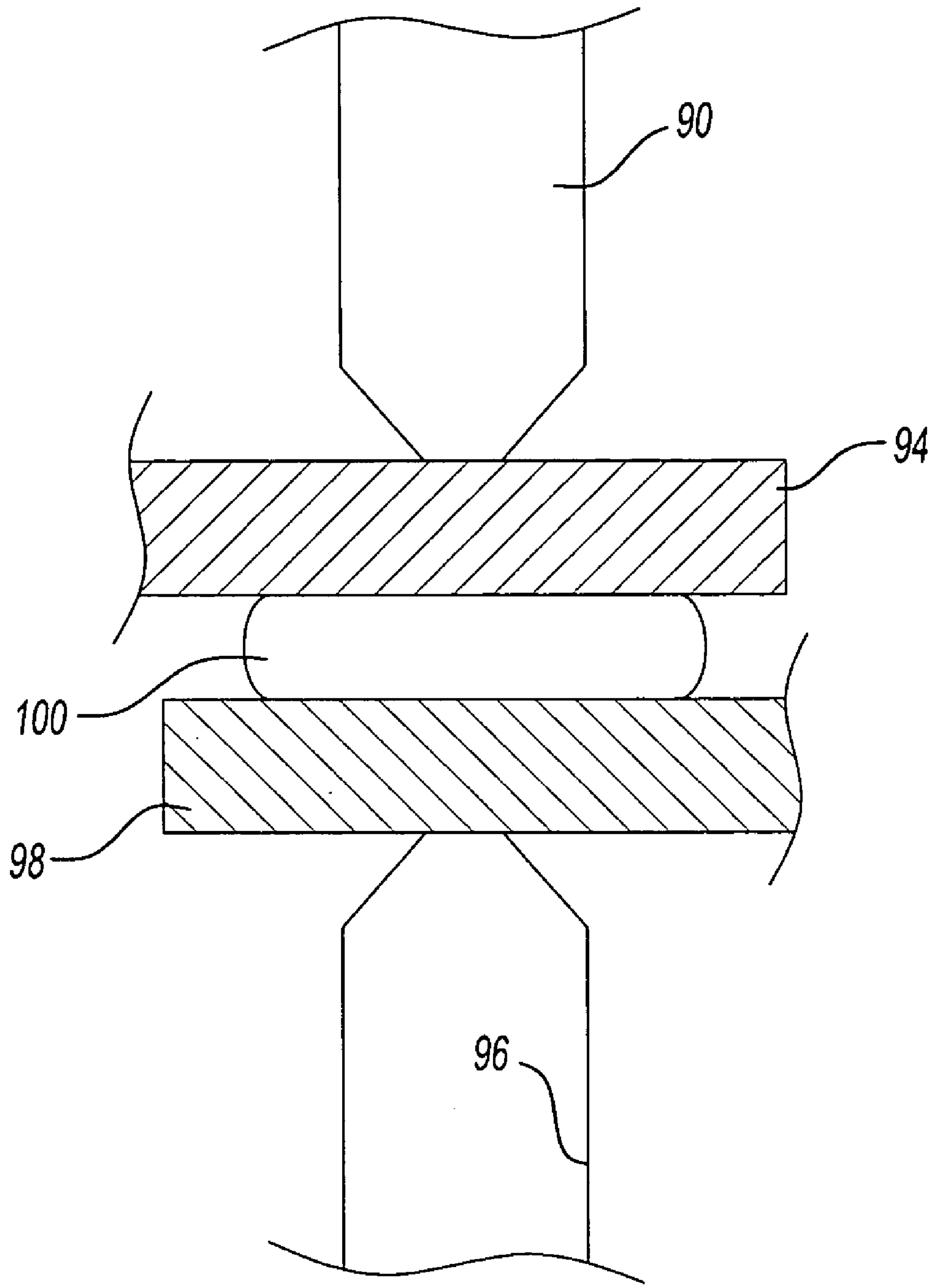
FIG. 4 is a diagram of one member being welded to another member according to one exemplary aspect of the present invention.

According to one embodiment, electrical resistance welding is employed, although other techniques may be employed as well. In such an embodiment, as shown in FIG. 4, a first electrode 90 is typically brought into abutting contact with a surface of a first member 94 and a second electrode 96 is typically brought into abutting contact with a surface of a second member 98. Upon such contact, at least a portion of the first member 94 and the second member 98 are located between the electrodes 90, 96. As shown, at least a portion of a mass 100 (shown as a strip) of activatable material is located between the members 94, 98, the electrodes 90, 96 or both. For welding, the electrodes 90, 96 move portions of the members 94, 98 toward each other thereby displacing a portion of the mass 100 of activatable material. Typically the portion of the members 94, 98 contact each other, although not necessarily required. At the same time or thereafter, an electrical current is typically induced to flow between the first electrode 90 and a second electrode 96 thereby forming one or more welds between and/or joining the first member 94 and a second member 98.

After application, the activatable material is preferably activated to cure, expand or both as has been described herein. Such activation may occur before welding, when a welding step is employed, but typically occurs thereafter. When the members are part of an automotive vehicle (e.g., body or frame components), the activation typically occurs during paint or coating processing steps.

If the activatable material has been applied to a carrier member to form a baffle, a reinforcement member, a seal or the like, the carrier member with the activatably material thereon is typically inserted within a cavity of a structure of an article of manufacture (e.g., an automotive vehicle). After insertion, the activatable material is typically activated to expand, cure or both thereby adhering the carrier to the structure of the article for forming a baffling, sealing or reinforcement system. Alternatively, if the activatable material has been applied to other members of an article of manufacture (e.g., members of an automotive vehicle) as discussed herein, the activatable material may be activated to expand, cure or both and form a seal, a reinforcement, a baffle, a sound absorption system, a combination thereof or the like.

After activation and depending upon the intended use of the activatable material, the material will typically exhibit one or more desired characteristics such as strength, sound absorption, vibration dampening, combinations thereof or the like. In one exemplary embodiment, which is particularly useful for reinforcement, the activatable or activated material can exhibit a shear strength (e.g., a lap shear strength) greater than about 500 psi, more typically greater than about 1000 psi, even more typically greater than about 1500 psi and still more typically greater than about 2200 psi.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A method of applying an activatable material to a member for providing sealing, baffling, reinforcement or a combination thereof to the member, the method comprising:

providing the activatable material to an extruder, the activatable material including at least one epoxy resin;

applying a bead of the activatable material onto a surface of a member of an article of manufacture with the extruder;

wherein, after applying the bead to the surface, the activatable material has a viscosity of at least about 100 poise and less than about 1500 poise at a temperature of 45° C. and a shear rate of 400 1/s, wherein, the bead is positioned upon the member such that, during assembly of the automotive vehicle, at least a portion of the bead is displaced during an electrical resistance welding operation.

2. A method as in claim 1 wherein the activatable material is expandable, thermosettable or both at an elevated temperature typically experienced in a paint or e-coat oven.

3. A method as in claim 1 wherein the article of manufacture is an automotive vehicle the activatable material has a viscosity of less than about 1200 poise at a temperature of 45° C. and a shear rate of 400 1/s.

4. A method as in claim 3 wherein the member is a metal component selected from a frame member or a body member of the automotive vehicle.

5. A method as in claim 1 wherein the activatable material includes conductive material.

6. A method as in claim 1 further comprising welding the member wherein the step of welding the member includes displacing at least a portion of the activatable material.

7. A method as in claim 1 wherein the step of providing the activatable material to the applicator includes supplying the activatable material as slugs to an inlet of an extruder.

8. A method as in claim 7 wherein a member is attached to the extruder for guiding the activatable material into the inlet of the extruder.

9. A method as in claim 8 wherein, upon provision of the slugs to the extruder, the slugs have a viscosity of at least about 100 poise and less than 1200 poise at 45° C. and a shear rate of 400 1/s.

10. A method as in claim 1 wherein the step of providing the activatable material to the applicator includes supplying pellets of a first portion of the activatable material to a first inlet of an extruder in a substantially solid substantially tack-free state and supplying a second portion of the activatable material to a second inlet of the applicator in substantially liquid state.

11. A method as in claim 10 wherein the first portion includes at least about 50% by weight polymeric materials having a relatively high molecular weight.

12. A method as in claim 11 wherein the second portion includes at least about 25% by weight polymeric materials having a relatively low molecular weight.

13. A method as in claim 1 wherein the step of providing the activatable material to the applicator includes supplying pellets of a first component of the activatable material to an extruder in a substantially solid substantially tack-free state and supplying a second component of the activatable material to the extruder as an encapsulated liquid.

14. A method of applying an activatable material to a member for providing sealing, baffling, reinforcement or a combination thereof to the member, the method comprising:

providing the activatable material to an extruder, the activatable material including at least one epoxy resin wherein the step of providing the activatable material includes at least one of the following:

i) supplying the activatable material as masses or slugs to an inlet of the extruder;

ii) supplying pellets of a first portion of the activatable material to a first inlet of the extruder in a substantially solid state and supplying a second portion of the activatable material to a second inlet of the extruder in substantially liquid state; or iii) supplying pellets of a first component of the activatable material to a first inlet of the extruder in a substantially solid state and supplying a second component of the activatable material to the first inlet as an encapsulated liquid;

applying a bead of the activatable material onto a surface of a member of an automotive vehicle with the extruder;

wherein the bead is positioned upon the member such that, during assembly of the automotive vehicle, at least a portion of the bead is displaced during an electrical resistance welding operation.

15. A method as in claim 14 wherein the activatable material is expandable, thermosettable or both at an elevated temperature typically experienced in a paint or e-coat oven.

16. A method as in claim 14 wherein the activatable material includes conductive material.

17. A method as in claim 14 wherein a member is attached to the extruder for guiding the activatable material into the inlet of the extruder, the member being conical or semi-conical.

18. A method as in claim 14 wherein, after applying the bead to the surface, the activatable material has a viscosity of at least about 100 poise and less than about 1200 poise at a temperature of 45° C. and a shear rate of 400 1/s.

19. A method of applying an activatable material to a member for providing sealing, baffling, reinforcement or a combination thereof to the member, the method comprising:

providing the activatable material to an applicator, the applicator being an extruder wherein the step of providing the activatable material includes at least one of the following:

i) supplying the activatable material as masses or slugs to an inlet of the applicator;

ii) supplying pellets of a first component of the activatable material to a first inlet of the applicator in a substantially solid state and supplying a second component of the activatable material to a second inlet of the applicator in substantially liquid state; or iii) supplying pellets of a first component of the activatable material to a first inlet of the applicator in a substantially solid state and supplying a second component of the activatable material to the first inlet as an encapsulated liquid;

applying a bead of the activatable material onto a surface of a member of an article of manufacture wherein:

i) the article of manufacture is an automotive vehicle;

ii) the member is a metal component selected from a frame member or a body member of the automotive vehicle;

iii) after applying the bead to the surface, the activatable material has a viscosity of at least about 100 poise and less than about 1200 poise at a temperature of 45° C. and a shear rate of 400 1/s;

welding a portion of the member by displacing at least a portion of the activatable material and passing electrical current through the member at a location from which the activatable material has been displaced;

activating the activatable material to expand, cure or both by exposing the activatable material to elevated temperatures in an automotive paint or e-coat oven.

20. A method as in claim 19 wherein the activatable material includes conductive material and the applicator is an extruder.

* * * * *